Patented Oct. 12, 1926.

1,603,192

UNITED STATES PATENT OFFICE.

FREDERICK W. CHAMBERLAIN, OF KNOXVILLE, TENNESSEE.

PAVING MATERIAL AND PROCESS OF MAKING SAME.

No Drawing. Application filed August 12, 1924. Serial No. 731,663.

This invention relates to plastic materials and is particularly directed to a plastic mixture comprising sand, coated with an adhesive. The invention also relates to the process of making such material.

The object of the invention is to produce plastic material which will comprise sand grains coated with an adhesive, said plastic being non-cohesive in order that it may be shoveled or packed in bags.

Another object of the invention is to provide a process by which sand grains may be coated with adhesive and cohesion of the mass prevented.

I contemplate using the plastic for road patching, road making, flooring, roofing, dock-decking and similar purposes. I prefer to use as an adhesive a bituminous mastic containing from 30 to 50% bitumen within a range of hardness of from 120 to 130 penetration and containing from 50 to 70% dust by volume, from 65 to 75% of which dust will pass a 200 mesh sieve. With this adhesive I mix approximately three times its volume of sand so graded and mixed that it will all pass a 10 mesh sieve, so that the smaller particles will fill the space between the larger particles. The resulting mass is brought to a temperature of approximately 350° F. and thoroughly mixed until sand grains are so far as possible, individually coated with the adhesive. While still hot this mass is released into cold water under agitation. The purpose of this is to cause each sand grain and its adhesive coating to harden individually, thereby preventing cohesion of the entire mass. Were it not for this emersing in cold water, the mass upon cooling would be hard like solid rock, whereas, in this process the coated sand grains harden individually and the mass can be handled just like ordinary sand and is adapted to be packed in bags and stored indefinitely at all ordinary temperatures without cohesion.

My invention can be used wherever it is desirable to have a product comprising sand adhesively coated but I particularly prefer sand of the grade specified mixed with the above described bituminous mastic.

Having described my invention, I claim:

1. A granular plastic material comprising sand grains generally characterized by a hardened coating thereupon consisting of a bituminous adhesive composed of bitumen mixed with from 50% to 70% of dust by volume, said bitumen being of such hardness that when combined with the dust the resultant adhesive has a penetration of from 120 to 130.

2. In the process of making a granular plastic material the step of coating sand grains by heating and mixing them with a bituminous adhesive containing from 50% to 70% dust by volume, said adhesive having a penetration of from 120 to 130, and the step of discharging said coated sand grains while in heated condition into cold water to cause the bituminous adhesive to harden about the sand grains substantially individually.

In witness whereof, I hereunto subscribe my name.

FREDERICK W. CHAMBERLAIN.